United States Defensive Publication [19] (H) [11] T103,202

Frazier et al. [43] Jul. 5, 1983

[54] PRODUCTION OF PURIFIED STRONG WET-PROCESS PHOSPHORIC ACID

[76] Inventors: Alva W. Frazier, 2219 Randolph; Ewell F. Dillard, Rte. 10, Box 196, both of Florence, Ala. 35630

[21] Appl. No.: 417,804

[22] Filed: Sep. 13, 1982

[51] Int. Cl.[3] ..... C01B 25/16

[52] U.S. Cl. ..... 423/321 R

[57] ABSTRACT

The concentration of impurities in wet-process phosphoric acid limits the usefulness of the acid for the production of fertilizers, feed-grade phosphate and detergents. The aluminum, magnesium, and fluoride impurities are removed with the calcium sulfate hemihydrate filter cake by hydrolyzing and recycling the off-gas scrubber solutions in the presence of a ferric iron catalyst. The aluminum and magnesium are reduced to less than 0.1 percent in the acid product by the precipitation of $(Ca,Mg)Al_2F_8.2H_2O$, which is acid insoluble and suitable for storage with the byproduct calcium sulfate. Ferric iron also serves as a catalyst for the simultaneous precipitation of $(Na,K)_2SiF_6$. Subsequent additions of potassium as, for example, in the teachings of Gilbert (U.S. Pat. No. 3,338,675), can then be applied to obtain a purified phosphoric acid product suitable for most commercial applications. The added potassium serves two purposes in the 40 to 55 percent $P_2O_5$ acid since ferric iron is reduced to 0.25 percent $Fe_2O_3$ by the precipitation of $Fe_3KH_{14}(PO_4)_8.4H_2O$ and the $SiF_6^{=}$ is reduced to about 0.2 percent by the precipitation of $K_2SiF_6$. This subsequent precipitate contains about 50 percent $P_2O_5$ and is as effective as superphosphate $[Ca(H_2PO_4)_2.H_2O]$ in supporting plant growth.

41 Claims, No Sheets Drawing,

41 Pages Specification

The file of this unexamined application may be inspected and copies thereof may be purchased (849 O.G. 1221, Apr. 9, 1968).